(12) United States Patent
Sun et al.

(10) Patent No.: US 9,336,011 B2
(45) Date of Patent: May 10, 2016

(54) SERVER AND BOOTING METHOD

(71) Applicants: Inventec (Pudong) Technology Corporation, Shanghai (CN); INVENTEC CORPORATION, Taipei (TW)

(72) Inventors: Yan-Long Sun, Shanghai (CN); Song Zhang, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 304 days.

(21) Appl. No.: 14/023,253

(22) Filed: Sep. 10, 2013

(65) Prior Publication Data

US 2015/0012736 A1 Jan. 8, 2015

(30) Foreign Application Priority Data

Jul. 8, 2013 (CN) .......................... 2013 1 0285448

(51) Int. Cl.
*G06F 9/00* (2006.01)
*G06F 9/44* (2006.01)

(52) U.S. Cl.
CPC ............ *G06F 9/4401* (2013.01); *G06F 9/4405* (2013.01)

(58) Field of Classification Search
CPC .... G06F 9/4401; G06F 9/4405; G06F 9/4416
USPC ................... 713/2, 1; 709/221, 222
See application file for complete search history.

(56) References Cited

U.S. PATENT DOCUMENTS

| 5,450,576 A | * | 9/1995 | Kennedy | ............... | G06F 9/4405 713/2 |
| 2008/0052504 A1 | * | 2/2008 | Tsuji | ..................... | G06F 9/4418 713/1 |
| 2008/0229092 A1 | * | 9/2008 | Dale | ..................... | G06F 9/4405 713/2 |
| 2010/0122075 A1 | * | 5/2010 | Chen | ..................... | G06F 9/4416 713/2 |
| 2013/0097412 A1 | * | 4/2013 | Dasari | ................... | G06F 9/4405 713/2 |

OTHER PUBLICATIONS

Intellectual Property Office, Ministry of Economic Affairs, R. O. C, "Office Action", Oct. 26, 2015, Taiwan.

* cited by examiner

*Primary Examiner* — Chun Cao
(74) *Attorney, Agent, or Firm* — Locke Lord LLP; Tim Tingkang Xia, Esq.

(57) ABSTRACT

A server including a basic input output system (BIOS) chip, a control unit and multiple central processing units (CPUs), and a booting method are provided. The BIOS chip outputs a booting signal. One of the CPUs receives the booting signal to execute a booting program, and outputs a successful signal after being booted. The control unit is coupled between the BIOS chip and the CPUs, and receives the successful signal to control a connection between the BIOS chip and the one of the CPUs. When the control unit receives the successful signal, the control unit replaces a connection between the BIOS chip and current one of the CPUs with a new connection between the BIOS chip and next one of the CPUs according to the successful signal, and the next CPU then receives the booting signal.

10 Claims, 2 Drawing Sheets

SERVER AND BOOTING METHOD

CROSS-REFERENCE TO RELATED APPLICATIONS

This non-provisional application claims priority under 35 U.S.C. §119(a) on Patent Application No(s). 201310285448.8 filed in China on Jul. 8, 2013, the entire contents of which are hereby incorporated by reference.

BACKGROUND OF THE INVENTION

1. Technical Field of the Invention

The disclosure relates to a server and a booting method thereof, more particularly to a server and a booting method thereof which are capable of helping the complete booting of all central processor units (CPUs) and are capable of reducing the manufacturing costs.

2. Description of the Related Art

Recently, a demand for electronic computing devices being applied in various fields is increasing with the enhancement of the electronic technology. Take the information technology as an example. The development of networks and the spreading of small and medium local area networks that are built in companies require a more professional network server system which has a better performance and is easy to be used. Therefore, a demand for data servers, which work as platforms which data for statistic analysis can be read out from and that can store data as well, is increasing much more in every enterprise. These data servers are required to be more stable and have a better efficiency.

In order to enhance the performance of the server, there are many CPUs which either execute their basic input output system (BIOS) respectively or take turns executing the same BIOS with a timing manner to complete their own booting task.

However, if any one of the CPUs malfunctions or delays its booting, the server will not know these sudden incidents. The booting task of a next CPU is still performed whenever the timing arrives. Because all the CPUs do not boot, this causes operation errors to occur in the entire server system.

SUMMARY OF THE INVENTION

A server, according to an embodiment of the disclosure, includes a basic input output system (BIOS) chip storing a BIOS, a plurality of central processing units (CPUs) and a control unit. The BIOS chip is configured to output a booting signal. Each of the CPUs is configured to receive the booting signal to execute a booting program, and to output a successful signal after being booted. The control unit is coupled between the BIOS chip and the CPUs and is configured to receive the successful signal to control a connection between the BIOS chip and each of the CPUs. When the control unit receives the successful signal, the control unit replaces a connection between the BIOS chip and current one of the CPUs with a new connection between the BIOS chip and next one of the CPUs according to the successful signal. The next CPU then receives the booting signal.

A booting method for a server, according to an embodiment of the disclosure, includes the following steps. A booting signal is outputted by a BIOS chip. The booting signal is received by one of a plurality of CPUs to execute a booting program, and a successful signal is outputted by the one of the CPUs after the one of the CPUs is booted. By a control unit, the successful signal is received, and a connection between the BIOS chip and the one of the CPUs is controlled according to the successful signal. When the control unit receives the successful signal, a connection between the BIOS chip and current one of the CPUs is replaced with a new connection between the BIOS chip and next one of the CPUs by the control unit according to the successful signal, and the next CPU then receives the booting signal.

BRIEF DESCRIPTION OF THE DRAWINGS

The present disclosure will become more fully understood from the detailed description given herein below for illustration only and thus does not limit the present disclosure, wherein.

DETAILED DESCRIPTION

Figure 1:
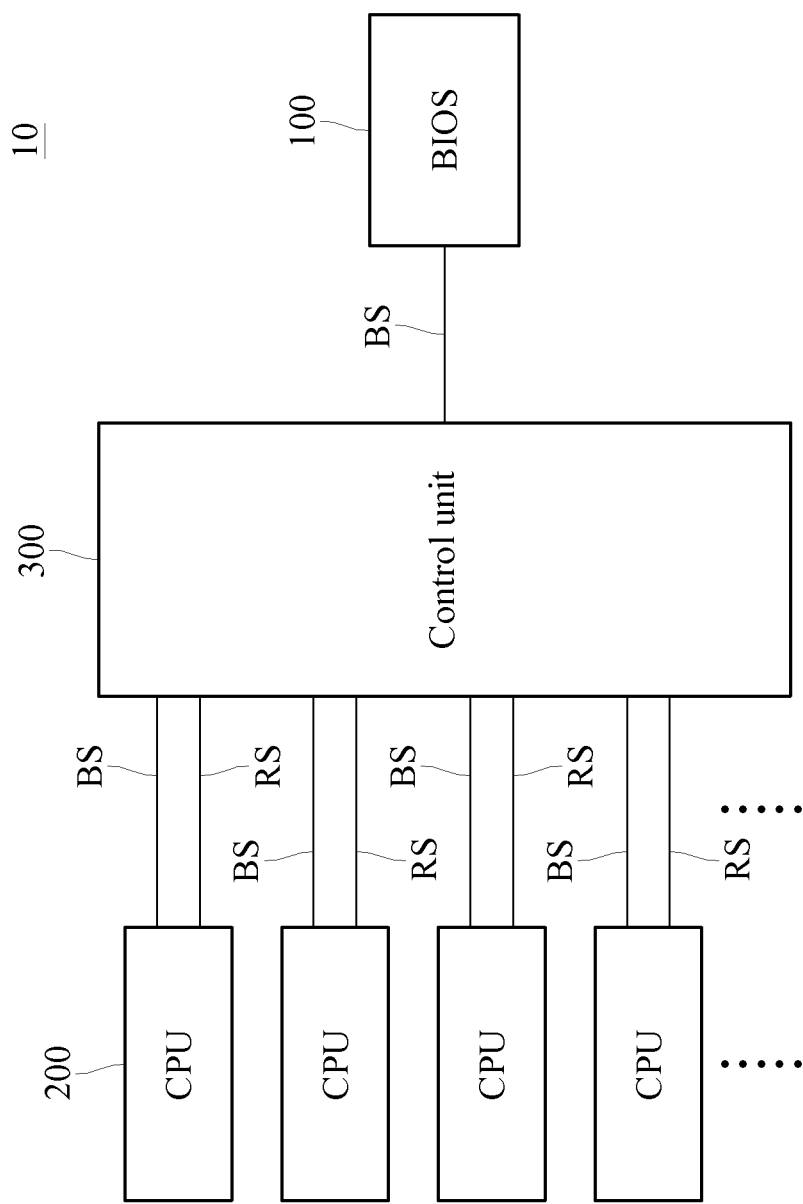
FIG. 1 is a schematic diagram of a server in the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a schematic diagram of a server in the disclosure. A server 10 includes a basic input output system (BIOS) chip 100 storing a BIOS, a plurality of central processing units (CPUs) 200 and a control unit 300, and is adapted to help all the CPUs 200 be booted. In other words, the server 10 can finish the booting task of the CPUs 200.

The BIOS chip 100 outputs a booting signal BS. One of the CPUs 200 receives the booting signal BS to execute a booting program, and outputs a successful signal RS after this CPU 200 is booted. The CPUs 200 receive the booting signal BS subsequently until the booting program finishes.

The control unit 300 is coupled between the BIOS chip 100 and the CPUs 200, and is configured to receive the successful signal RS, and according to the successful signal RS, control one of the CPUs 200 to connect with the BIOS chip 100. Specifically, when current one of the CPUs 200 is supplied with power successfully, the current CPU 200 will correspondingly output a power-on signal at a low logic level to the control unit 300. The control unit 300 will further connect the BIOS chip 100 to the current CPU 200. After being booted, the current CPU 200 outputs the power-on signal at a high logic level and the successful signal RS to the control unit 300. Then, the control unit 300 further cuts off the connection between the BIOS chip 100 and the current CPU 200 and connects the BIOS chip 100 to next one of the CPUs 200 according to the successful signal RS. The next CPU 200 will follow the current CPU 200 to receive the booting signal BS to perform the following operation.

In an embodiment, the control unit 300 is a complex programmable logic device (CPLD) or similar components. In an embodiment, the BIOS chip 100 is coupled to the control unit 300 through a serial peripheral interface (SPI) bus, the control unit 300 is coupled to each of the CPUs 200 through a SPI bus, and the successful signal RS is transmitted from each CPU 200 to the control unit 300 via a general purpose input output (GPIO) port.

Even though the aforementioned embodiments are based on the four CPUs 200 shown in FIG. 1, the disclosure will not be limited thereto. In other embodiments, the quantity of the CPUs 200 can be 2, 3 or more than 5.

An exemplary operation of the server 10 is taken as follows. After being supplied with power successfully, a first one of the CPUs 200, i.e. the current CPU 200, outputs a power-on signal at a low logic level to the control unit 300. The control unit 300 further connects the BIOS chip 100 to the first CPU 200 according to the power-on signal at the low logic level. Subsequently, when the BIOS chip 100 outputs the booting signal BS to the first CPU 200, the first CPU 200 will execute the booting program. After the first CPU 200 is booted, the first CPU 200 outputs the power-on signal at a high logic level and the successful signal RS to the control unit 300. The successful signal RS indicates that the first CPU 200 has been booted successfully.

Then, the control unit 300 cuts off the connection between the BIOS chip 100 and the first CPU 200 and connects the BIO chip 100 to a second one of the CPUs 200, i.e. the next CPU 200, according to the successful signal RS outputted by the first CPU 200. That is, the control unit 300 replaces the connection between the BIOS chip 100 and the first CPU 200 with a new connection between the BIOS chip 100 and the second CPU 200 according to the successful signal RS. After the second CPU 200 is supplied with power successfully, the second CPU 200 also outputs a power-on signal at a low logic level to the control unit 300, and then follows the first CPU 200 to receive the booting signal BS from the control unit 300 to execute the booting program.

After the second CPU 200 is booted, the second CPU 200 outputs the power-on signal at a high logic level and a successful signal RS to the control unit 300, whereby the control unit 300 will know that the second CPU 200 has been booted successfully. The control unit 300 further replaces the connection between the BIOS chip 100 and the second CPU 200 with a new connection between the BIOS chip 100 and next one of the CPUs 200, i.e. a third one of the CPUs 200, which is next to the second CPU 200, according to the successful signal RS outputted by the second CPU 200.

Further, after the third CPU 200 is supplied with power successfully, the third CPU 200 outputs a power-on signal at a low logic level to the control unit 300, and then the third CPU 200 can follow the second CPU 200 to receive the booting signal BS to execute its booting task. In the way, all the CPUs 200 can be booted and started up.

On the other hand, if any one of the CPUs 200 is not booted successfully, this CPU 200 will unceasingly receive the booting signal BS until the booting program is executed completely. In other words, the CPU 200 will continuously receive the booting signal BS until the booting program is finished and the successful signal RS is generated and is outputted to the control unit 300. In this way, all the CPU 200s may be booted completely.

Figure 2:
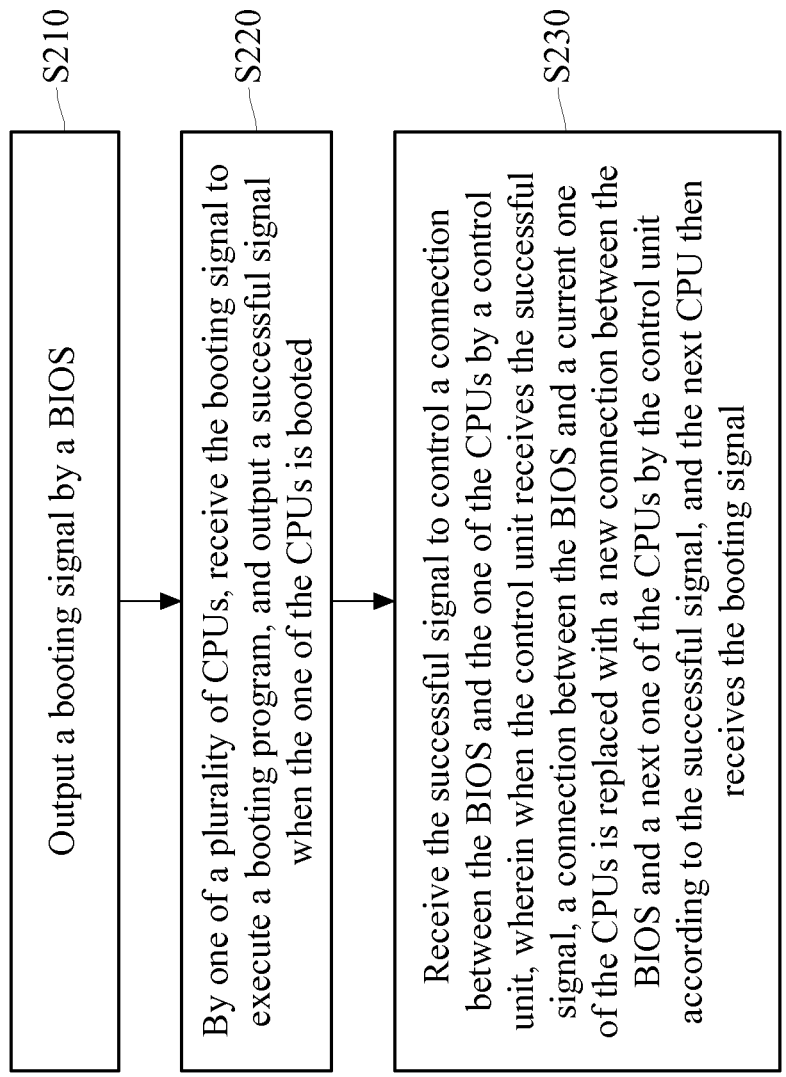
FIG. 2 is a flow chart of a booting method of the disclosure.

The aforementioned operation of the server 10 can be summed up in a booting method as shown in FIG. 2. The booting method is applicable to a server and includes the following steps. Firstly, a BIOS chip outputs a booting signal in step S210. In step S220, one of a plurality of CPUs receives the booting signal to execute a booting program, and outputs a successful signal after the one of the CPUs is booted. In step S230, a control unit receives the successful signal to control a connection between the BIOS chip and the one of the CPUs. When the control unit receives the successful signal, the control unit replaces a connection between the BIOS chip and current one of the CPUs with a new connection between the BIOS chip and next one of the CPUs according to the successful signal. The next CPU then receives the booting signal.

In this or some embodiments, the booting method can further include the following steps. After the current CPU is supplied with power successfully, the current CPU outputs a power-on signal at a low logic level to the control unit. When receiving the power-on signal from the current CPU, the control unit connects the BIOS chip to the current CPU. After the current CPU is booted, the current CPU outputs the power-on signal at a high logic level and the successful signal to the control unit. Then, the control signal further cuts off the connection between the BIOS chip and the current CPU, and then performs a next booting task on the next CPU.

As set forth above, in the disclosure, the BIOS chip outputs a booting signal to current one of the CPUs, and the current one of the CPUs then executes the booting program and after being booted, outputs a successful signal. Subsequently, the control unit receives the successful signal and thereby controls a connection between the BIOS chip and the current one of the CPUs. In this way, the disclosure may efficiently help all the CPUs be booted completely.

What is claimed is:

1. A server, comprising:
    a basic input output system (BIOS), stored in a BIOS chip and configured to output a booting signal;
    a plurality of central processing units (CPUs), each being configured to receive the booting signal to execute a booting program, and output a successful signal after being booted; and
    a control unit, coupled between the BIOS chip and the CPUs and configured to receive the successful signal to control a connection between the BIOS chip and each of the CPUs,
    wherein, when the control unit receives the successful signal, the control unit replaces a connection between the BIOS chip and current one of the CPUs with a new connection between the BIOS chip and next one of the CPUs according to the successful signal, and then the next CPU receives the booting signal to execute the booting program.

2. The server according to claim 1, wherein the current CPU outputs a power-on signal at a low logic level to the control unit after the current CPU is supplied with power successfully, the control unit connects the BIOS chip to the current CPU according to the power-on signal, and the current CPU outputs the power-on signal at a high logic level and the successful signal to the control unit after the current CPU is booted.

3. The server according to claim 1, wherein the CPUs sequentially execute the booting program.

4. The server according to claim 1, wherein each of the CPUs continuously receives the booting signal until the booting program finishes.

5. The server according to claim 1, wherein the BIOS chip is coupled to the control unit through a serial peripheral interface (SPI) bus.

6. The server according to claim 1, wherein the control unit is coupled to each of the CPUs through a serial peripheral interface (SPI) bus.

7. The server according to claim 1, wherein the successful signal is transmitted to the control unit through a general purpose input output (GPIO) port.

8. The server according to claim 1, wherein the control unit is a complex programmable logic device (CPLD).

9. A booting method, adapted to a server and comprising:
    outputting a booting signal by a basic input output system (BIOS) stored in a BIOS chip;
    by one of a plurality of CPUs, receiving the booting signal to execute a booting program, and outputting a successful signal after the one of the CPUs is booted; and by a control unit, receiving the successful signal to control a connection between the BIOS chip and the one of the CPUs, wherein, when the control unit receives the successful signal, a connection between the BIOS chip and current one of the CPUs is replaced with a new connection between the BIOS chip and next one of the CPUs by the control unit according to the successful signal, and the next CPU then receives the booting signal to execute the booting program.

10. The booting method according to claim 9, further comprising:

outputting a power-on signal at a low logic level from the current CPU to the control unit after the current CPU is supplied with power successfully, and then making the connection between the BIOS chip and the current CPU by the control unit; and outputting the power-on signal at a high logic level and the successful signal from the current CPU to the control unit after the current CPU is booted.

* * * * *